United States Patent
Zhidkov et al.

(10) Patent No.: US 8,320,477 B2
(45) Date of Patent: Nov. 27, 2012

(54) METHOD FOR INTER-CARRIER INTERFERENCE CANCELLATION AND EQUALIZATION METHOD, APPARATUS, AND OFDM RECEIVER USING THE METHOD

(75) Inventors: Sergey Zhidkov, Suwon-si (KR); Guangbui Liu, Suwon-si (KR); Jinhee Cheon, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1069 days.

(21) Appl. No.: 12/257,723

(22) Filed: Oct. 24, 2008

(65) Prior Publication Data

US 2009/0161779 A1 Jun. 25, 2009

(30) Foreign Application Priority Data

Oct. 25, 2007 (KR) .......................... 10-2007-0107556

(51) Int. Cl.
*H04K 1/10* (2006.01)

(52) U.S. Cl. ........ 375/260; 375/229; 375/278; 375/316; 375/342; 375/349

(58) Field of Classification Search .................. 375/229, 375/232, 233, 260, 271, 278, 285, 316, 322, 375/342, 346, 348, 349

See application file for complete search history.

(56) References Cited

U.S. PATENT DOCUMENTS

| | | | | |
|---|---|---|---|---|
| 7,418,035 | B1* | 8/2008 | Clark | 375/233 |
| 7,724,832 | B2* | 5/2010 | Hosur et al. | 375/260 |
| 7,751,372 | B2* | 7/2010 | Monsen | 370/335 |
| 7,826,517 | B2* | 11/2010 | Kim et al. | 375/148 |
| 7,912,118 | B2* | 3/2011 | Wang et al. | 375/229 |
| 8,000,417 | B1* | 8/2011 | Zhidkov et al. | 375/346 |
| 8,085,837 | B2* | 12/2011 | Healey et al. | 375/226 |
| 2003/0063680 | A1* | 4/2003 | Nedic et al. | 375/260 |
| 2004/0001427 | A1 | 1/2004 | Belotserkovsky et al. | |
| 2006/0029149 | A1* | 2/2006 | Kim et al. | 375/267 |
| 2006/0239367 | A1 | 10/2006 | Wilhelmsson et al. | 375/260 |
| 2009/0296845 | A1* | 12/2009 | Alexander et al. | 375/267 |

FOREIGN PATENT DOCUMENTS

| | | |
|---|---|---|
| KR | 10-2005-0067327 | 7/2005 |
| KR | 10-2006-0071084 | 6/2006 |

* cited by examiner

*Primary Examiner* — Hirdepal Singh
(74) *Attorney, Agent, or Firm* — F.Chau & Associates, LLC

(57) ABSTRACT

An inter-carrier interference ICI cancellation method of a $k^{th}$ sub-carrier of an orthogonal frequency division multiplexing OFDM receiving signal (k is a natural number greater than 1 and less than or equal to n, n is a number of sub-carriers) includes canceling an inter-carrier interference element produced by at least one sub-carrier among inter-carrier interference elements of the $k^{th}$ sub-carrier by a decision feedback equalization DFE method, and canceling another inter-carrier interference element produced by at least another sub-carrier among inter-carrier interference elements of the $k^{th}$ sub-carrier by a linear minimum mean square error equalization LMMSE method.

16 Claims, 8 Drawing Sheets

METHOD FOR INTER-CARRIER INTERFERENCE CANCELLATION AND EQUALIZATION METHOD, APPARATUS, AND OFDM RECEIVER USING THE METHOD

CROSS REFERENCE TO RELATED APPLICATION

This application claims priority under 35 U.S.C. §119 to Korean Patent Application No. 10-2007-0107556, filed on Oct. 25, 2007, the disclosure of which is incorporated by reference herein.

BACKGROUND OF THE INVENTION

1. Technical Field

The present disclosure relates to methods for inter-carrier interference (ICI) cancellation or compensation, and more particularly, to two step ICI cancellation methods having low complexity and good performance in a time-varying channel, i.e., a mobile channel.

2. Discussion of the Related Art

Orthogonal frequency division multiplying (OFDM) is a robust technique for efficiently transmitting data over a channel. The technique uses a plurality of a sub-carrier frequencies (sub-carriers) within a channel bandwidth to transmit the data. These sub-carriers are arranged for optimal bandwidth efficiency compared to conventional frequency division multiplying (FDM) which can waste portions of the channel bandwidth in order to separate and isolate the sub-carrier frequency spectra, and thereby avoid inter-carrier interference (ICI).

In contrast, although the frequency spectra of OFDM sub-carriers overlap significantly within the OFDM channel bandwidth, OFDM nonetheless allows resolution and recovery of the information that has been modulated onto each sub-carrier.

The transmission of data through a channel using OFDM signals results in a tolerance to multipath delay spread and frequency selective fading, efficient spectrum usage, simplified sub-channel equalization, and good interference properties.

However, OFDM requires very accurate frequency synchronization between the receiver and the transmitter; with frequency deviation the sub-carriers are no longer orthogonal, causing ICI or cross talk between the sub-carriers.

Frequency offsets are typically caused by mismatched transmitter and receiver oscillators, or by a Doppler shift due to movement. While Doppler shift alone may be compensated for by the receiver, the situation is worsened when combined with multipath, as reflections will appear at various frequency offsets making them harder to correct.

This effect worsens as speed increases, and is a factor in limiting the use of the OFDM in high-speed vehicles such as in mobile TV applications in automobiles, buses, trains, etc.

There are several different standards for mobile TV using OFDM as an air interface, digital video broadcast handheld (DVB-H) quickly gaining ground in Europe, digital media broadcast (DMB) deployed in Korea, and forward link only (FLO), which offers mobile TV services in the U.S. via the media FLO system, for example.

For improved performance of an OFDM receiver, some of the sub-carriers in some of the OFDM symbols may carry pilot signals for measurement of the channel conditions, i.e. the equalizer gain and phase shift for each sub-carrier. Pilot signals and training symbols may also be used for time synchronization (to avoid inter-symbol interference, ISI) and frequency synchronization (to avoid inter-carrier interference, ICI, caused by Doppler shift).

FIG. 1 is a schematic functional block diagram of an conventional OFDM receiver without an ICI canceling element.

Referring to FIG. 1, a conventional OFDM receiver 10 may include a down-converter 1 down-converting a signal, which was up-converted by an OFDM transmitter (not shown), an analog/digital converter (ADC) 2 converting a signal output from the down-converter 1 to a digital signal, a guard interval (GI) remover 3 removing an inputted guard interval from the OFDM transmitter (not shown) for channel estimation in the signal output from the ADC 2, a Fast Fourrier Transform (FFT) unit 4 fast Fourier transforming a signal output from the GI remover 3, a channel estimation apparatus 6 estimating a channel frequency response based on a FFT signal converted by the FFT unit 4, an equalizer 5 equalizing the FFT converted signal based on the channel frequency response output from the channel estimation apparatus, and a decoder 7 decoding an equalized signal output from the equalizer 5.

As illustrated in FIG. 1, the equalizer 5 may be used in a static environment; however, it may have a remarkably lowered performance in a mobile environment because of not having a circuit for inter-carrier interference ICI cancellation.

A method for reducing the influence of ICI uses an OFDM symbol of a shorter duration. However, this method is weak due to a channel delay-spread and can not be used in single frequency networks.

ICI cancellation methods may be broadly divided into two kinds. One is a linear minimum mean square error LMMSE method and another is a decision-feedback error DFE method.

The LMMSE method has strength in canceling ICI almost perfectly; however, it requires high complexity. On the other hand, the DFE method has good performance with a comparably low complexity by estimating an ICI element through a preliminary decision or a hard-decision and performing repetitively a method to cancel an estimated ICI element from a received signal. However, in the DFE method, when an error percentage of the first preliminary decision or the hard decision is comparably big, there is an error propagation effect lowering the performance of total OFDM receiver as the DFE is performed repetitively. Therefore, a method and an apparatus for ICI cancellation, which can overcome the demerits of the aforementioned ICI cancellation methods and make the best use of each strength is desired.

SUMMARY OF THE INVENTION

Exemplary embodiments of the present invention seek to provide an effective ICI cancellation method having both a comparably high accuracy of a LMMSE method and a comparably low complexity of a DFE method.

According to an exemplary embodiment of the present invention an inter-carrier interference ICI cancellation method of a $k^{th}$ sub-carrier of an OFDM receiving signal (k is greater than 1 and smaller than or equal to n, n is a number of sub-carriers), includes canceling an inter-carrier interference element produced by at least one sub-carrier among inter-carrier interference elements of the $k^{th}$ sub-carrier by a decision feedback equalization DFE method; and canceling another inter-carrier interference element, produced by at least another sub-carrier, among inter-carrier interference elements of the $k^{th}$ sub-carrier by a linear minimum mean square error equalization LMMSE method.

Canceling by the LMMSE method may include canceling inter-carrier interference elements produced by the $k^{th}$ sub-carrier to a $(k \pm L)^{th}$ sub-carrier (L is a natural number more than or equal to 1 and less than n/2).

Canceling by the DFE method may include canceling inter-carrier interference elements produced by the $(k \pm L)^{th}$ sub-carrier to a $(k \pm Q)^{th}$ sub-carrier (Q is a natural number more than or equal to 2 and less than n/2).

Canceling by the DFE method may include canceling inter-carrier interference elements produced by a $(k \pm (L+1))^{th}$ sub-carrier to a $(k \pm Q)^{th}$ sub-carrier. L may be a natural number smaller than Q. The LMMSE method may include a L-order LMMSE method.

According to an exemplary embodiment of the present invention an equalization method, includes equalizing a signal, which is output from a fast Fourier transform FFT unit, based on a channel frequency response output from a channel estimation apparatus, canceling an inter-carrier interference element, produced by at least one sub-carrier, among inter-carrier interference elements of a $k^{th}$ sub-carrier of the equalized signal by a decision feedback equalization DFE method; and canceling another inter-carrier interference element, produced by at least another sub-carrier, among inter-carrier interference elements of the $k^{th}$ sub-carrier by a linear minimum mean square error equalization LMMSE method.

Canceling by the LMMSE method may include canceling inter-carrier interference elements produced by the $k^{th}$ sub-carrier to a $(k \pm L)^{th}$ sub-carrier.

Canceling by the DFE method may include canceling inter-carrier interference elements produced by the $(k \pm L)^{th}$ sub-carrier to a $(k \pm Q)^{th}$ sub-carrier. Canceling by the DFE method may include canceling an inter-carrier interference elements produced by the $k \pm (L+1)^{th}$ sub-carrier to a $(k \pm Q)^{th}$ sub-carrier.

According to an exemplary embodiment of the present invention an equalization apparatus, includes an internal equalizer equalizing a signal, which is output from a FFT unit, based on a channel frequency response output from a channel estimation apparatus, a DFE compensator canceling an ICI element of a signal output from the internal equalizer by a DFE method, and a LMMSE equalizer canceling another ICI element of a signal output from the DFE compensator by a LMMSE method.

The internal equalizer may include a divider dividing the signal output from the FFT unit by the channel frequency response output.

The DFE compensator may include a decision apparatus making a preliminary decision on a signal output from the internal equalizer, a multiplier multiplying a signal output from the decision apparatus by a channel slope vector output from the channel estimation apparatus, a DFE filter filtering an inter-carrier interference element produced by at least one sub-carrier among inter-carrier interference elements of a $k^{th}$ sub-carrier of a signal output from the multiplier through a decision feedback equalization DFE method, and a subtractor subtracting a signal output from the DFE filter from a signal output from the FFT unit.

The LMMSE equalizer may cancel another ICI element produced by at least another sub-carrier among ICI elements of the $k^{th}$ sub-carrier of the signal output from the DFE compensator through a linear minimum mean square error equalization LMMSE method. The LMMSE equalizer may cancel ICI elements produced by the $k^{th}$ sub-carrier to a $(k \pm L)^{th}$ sub-carrier. The DFE filter may cancel ICI elements produced by the $(k \pm L)^{th}$ sub-carrier to a $(k \pm Q)^{th}$ sub-carrier.

The DFE filter may cancel ICI elements produced by a $k \pm (L+1)^{th}$ sub-carrier to a $(k \pm Q)^{th}$ sub-carrier. The LMMSE equalizer may be a L-order LMMSE equalizer. L may be a natural number smaller than the Q.

According to an exemplary embodiment of the present invention is directed to an OFDM receiver, including the equalizer and a decoder receiving a signal output from the equalizer and decoding a received signal.

BRIEF DESCRIPTION OF THE DRAWINGS

Exemplary embodiments of the present invention will become apparent by reference to the following detailed description taken in conjunction with the accompanying drawings, wherein.

DETAILED DESCRIPTION OF EXEMPLARY EMBODIMENTS

Figure 1:
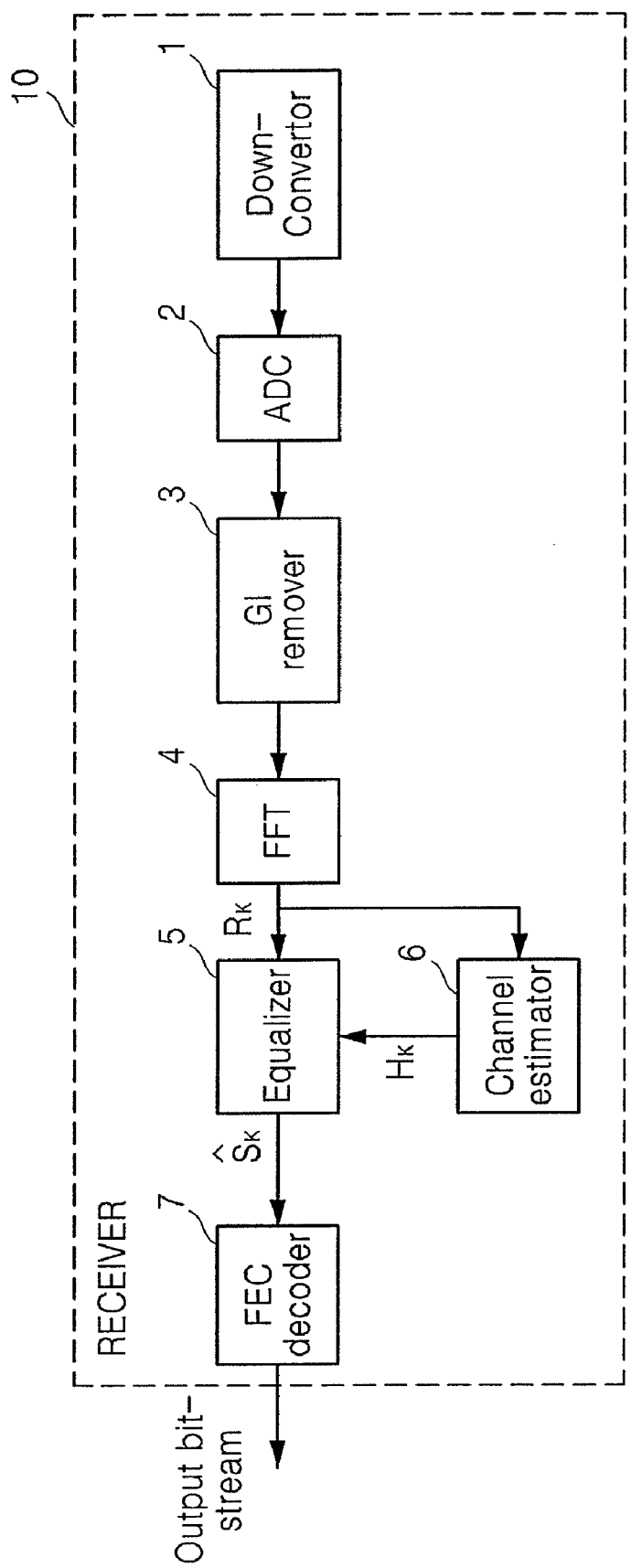
FIG. 1 is a schematic functional block diagram of a conventional OFDM receiver.

Hereinafter, exemplary embodiments of the present invention will be described in detail with reference to the accompanying drawings, wherein like reference numerals refer to the like elements throughout. An OFDM $S_n$, to be transmitted from an OFDM transmitter, may be represented by the following an equation. (Equation 1)

$$s_n = \sum_{l=0}^{N-1} S_l e^{j2\pi n l/N} \quad n = 0, 1, \ldots N-1$$

In Equation 1, $S_l$ can be a quadrature amplitude modulation QAM symbol in a frequency domain and N may mean a size of a discrete Fourier transform DFT.

When the OFDM signal to be transmitted is received through a time-varying multi-path channel, it can be represented by the equation below. (Equation 2)

$$r_n = \sum_{m=0}^{N-1} h_m(n) s_{n-m} + w_n, \quad n = 0, 1, \ldots N-1$$

In Equation 2, $h_m(n)$ shows a channel impulse response at time n.

The OFDM signal shown in equation 2 may go through a predetermined down-converting or an analog digital converting process. It may also go through a process of combining or removing an inserted guard interval GI in an OFDM transmitter.

Then, the signal goes through a DFT process, e.g., a fast Fourier transform FFT and may be represented by the equation below. (Equation 3)

$$R = Fr = \Lambda S + W$$

In Equation 3, F shows a DFT matrix and represents respectively $R=[R_0 \ldots R_{N-1}]^T$, $r=[r_0 \ldots r_{N-1}]^T$, $S=[S_0 \ldots S_{N-1}]^T$. Also, $W=[W_0 \ldots W_{N-1}]^T$ shows additive white Gaussian noise AWGN in a frequency domain, and $\Lambda$ shows a channel matrix. Elements of the channel matrix may be expressed by $[\Lambda]_{d,k} = \lambda(d-k,k)$.

Here, (Equation 4)

$$\lambda(d, k) = \frac{1}{N} \sum_{n=0}^{N-1} \sum_{m=0}^{N-1} h_m(n) e^{-j2\pi(mk+dn)/N}$$

For example, $\lambda(0,:)$, $\lambda(+1,:)$, and $\lambda(-1,:)$ respectively show a main diagonal vector of the channel matrix, a first lower sub-diagonal vector of the channel matrix, and a first upper sub-diagonal vector of the channel matrix.

Elements of the channel matrix may be approximated by using a first derivative. Coefficients of the channel matrix may also be approximated and elements of the channel matrix may be expressed as follows.

$$\lambda(0,k) = \overline{H}_k, \ k=\overline{1,N}$$ (Equation 5)

$$\lambda(q,k) = \xi_q dH_k, \ k=\overline{1,N}$$ (Equation 6)

$$\lambda(-q,k) = \xi^*_q dH_k, \ k=\overline{1,N}$$ (Equation 7)

Here, $$\xi_q = \frac{1}{2\left[e^{j\frac{2\pi q}{N}} - 1\right]}$$ (Equation 8)

Also, $dH_k$ shows an approximate value of a channel slope vector.

A LMMSE equalizer may be represented by the following equation $$\hat{S} = \Lambda^H \left(\Lambda \Lambda^H + \frac{1}{\sigma^2} I_N\right)^{-1} R$$ (Equation 9)

Here, $\sigma^2$ is the variance of AWGN.

As shown in equation 9, an inverse matrix operation of an N×N matrix is required in a LMMSE equalizer and, in this case, the complexity becomes of an order of $N^3$. Such high complexity can be a fatal problem in using the LMMSE equalizer because the N is about 8000 in case of an actual OFDM system, e.g., a DVB-T or DVB-H.

To reduce such high complexity, an approximation of an LMMSE method may be used.

The method uses a banded-diagonal approximation of a channel matrix, i.e., a method of setting elements of all channel matrices except a main diagonal vector, that is, upper and lower L sub-diagonal vectors of the main diagonal vector to 0.

This method may be called an L-order LMMSE method. The L-order LMMSE method considers only an ICI element generated based on L sub-carriers (i.e., 2L sub-carriers in both directions) neighboring a sub-carrier in each direction for calculations when performing equalization. Only neighboring sub-carriers are considered in an L-order LMMSE is because an ICI element is influenced by a distance between sub-carriers.

Figure 2:
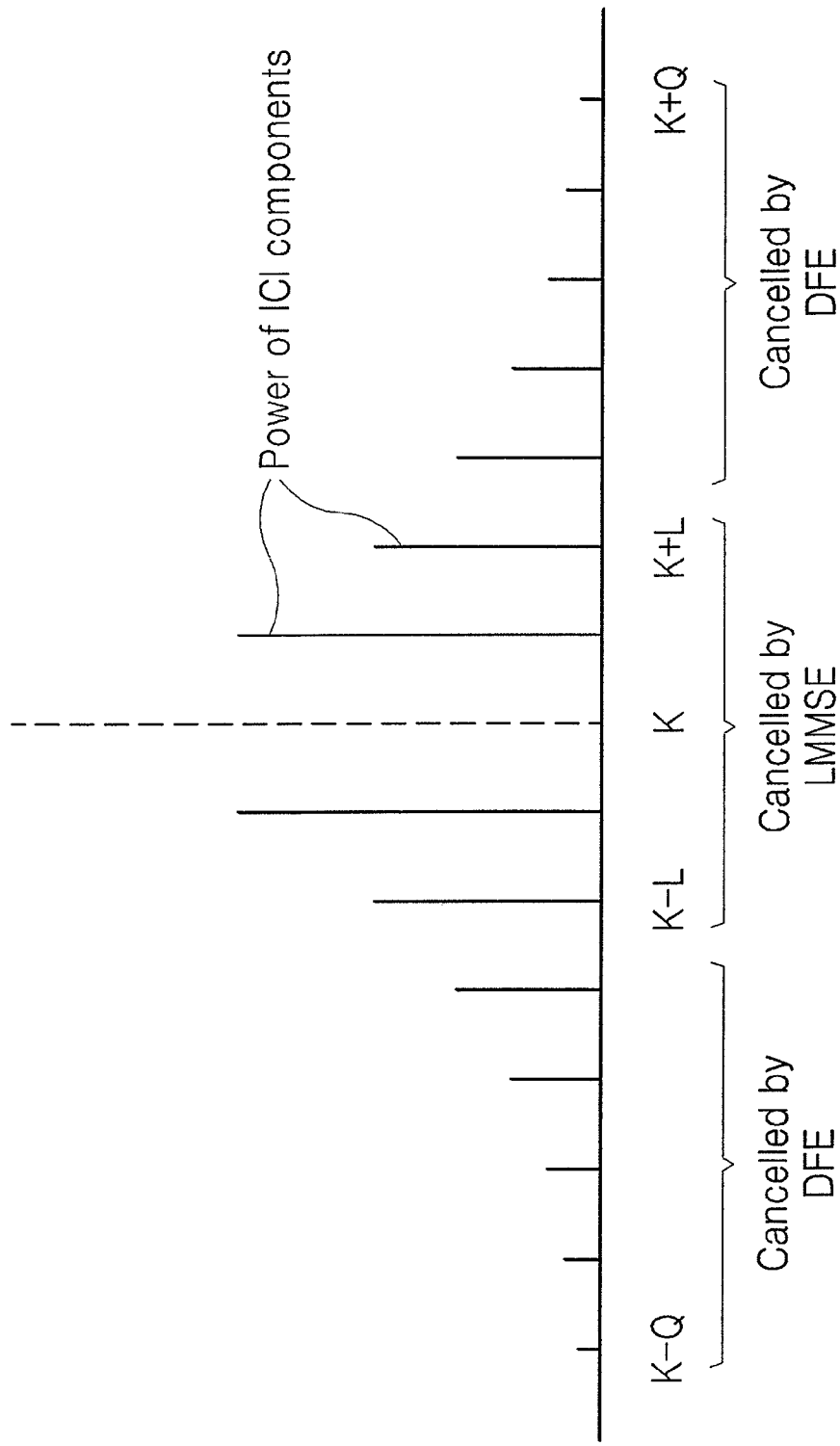
FIG. 2 shows an ICI power distribution among adjacent sub-carriers used for explaining the ICI equalization method according to an exemplary embodiment of the present invention.

FIG. 2 shows an ICI power distribution among adjacent sub-carriers in an ICI method according to an exemplary embodiment of the present invention. Referring to FIG. 2, an ICI may be based on an energy leak between sub-carriers in a time-varying channel, and such energy leak may be influenced in proportion to a distance between sub-carriers.

For example, the most influential sub-carrier to an ICI of a $k^{th}$ sub-carrier may be $(k-1)^{th}$ sub-carrier and $(k+1)^{th}$ sub-carrier, which are the closest to the $k^{th}$ sub-carrier. In contrast, as a sub-carrier is farther away from the $k^{th}$ sub-carrier, the influence on an ICI of the $k^{th}$ sub-carrier grows smaller.

Therefore, an ICI method according to an exemplary embodiment of the present invention may consider only an influence of 2L sub-carriers nearby a $k^{th}$ sub-carrier when performing its calculations. Accordingly, an approximated channel matrix in an L-order LMMSE may set all elements except the 2L+1 diagonal vectors to 0.

Figure 3:
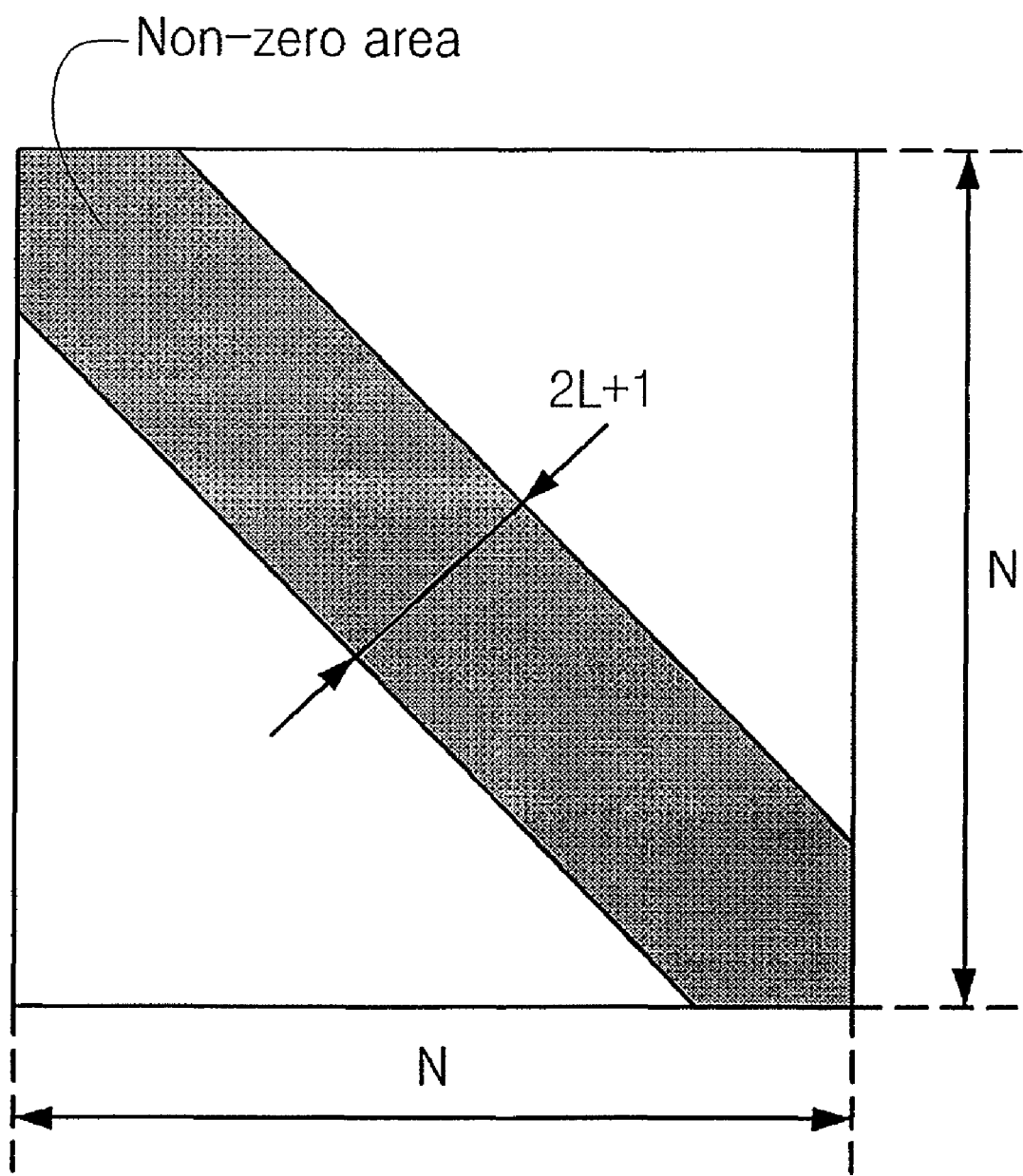
FIG. 3 schematically shows a channel matrix for a L-order LMMSE of an ICI cancellation method according to an exemplary embodiment of the present invention.

FIG. 3 schematically shows a shape of a channel matrix for an L-order LMMSE in an ICI cancellation method according to an exemplary embodiment of the present invention. Referring to FIG. 3, when the original LMMSE is a N×N channel matrix, a channel matrix for the L-order LMMSE may be composed of a main diagonal vector corresponding to a $k^{th}$ sub-carrier, upper L sub-diagonal vectors of the main diagonal vector, and lower L sub-diagonal vectors of the main diagonal vector. The remaining elements of the channel matrix may be all set to 0.

Accordingly, an L-order LMMSE may reduce complexity by performing an equalization considering only ICI elements generated by a predetermined neighboring sub-carrier, and disregarding ICI elements generated by the rest of the sub-carriers. Parameter L may be decided as a trade off between complexity and performance. Generally, L may be set to a number smaller than 3.

The aforementioned L-order LMMSE method exhibits excellent performance compared to an equalizer used in a static channel, e.g., an equalizer not considering an ICI element such as the one illustrated in FIG. 1. An L-order LMMSE method exhibits improved performance with relatively low complexity when L is set to 1 or 2, however, it may not achieve the performance of a full LMMSE method.

The reduced performance is caused by disregarding ICI elements based on sub-carriers other than sub-carriers close to a $k^{th}$ sub-carrier. An ICI cancellation method according to an exemplary embodiment of the present invention may cancel an ICI element generated by a sub-carrier disregarded in the L-order LMMSE using the DFE method as described above.

On the other hand, while a full LMMSE equalizer is expressed by equation 9, an L-order LMMSE equalizer using an approximated channel matrix may be represented by the equation below.

$$\hat{S}_k = f_k^H R_k \ k=0, 1, \ldots, N$$ (Equation 10)

Here, $$f_k = (\sigma^2 I_{2L} + \Lambda_k \Lambda_k^H)^{-1} \lambda_k \ R_k = [R_{k-L} \ldots R_{k+L}]^T, \text{ and}$$ (Equation 11)

$$\Lambda_k = \begin{bmatrix} \lambda_{k-L,k-2L} & \cdots & \lambda_{k-L,k} \\ & \ddots & \vdots & \ddots \\ & & \lambda_{k+L,k} & \cdots & \lambda_{k+L,k+2L} \end{bmatrix}$$ (Equation 12)

$$\lambda_k = [\lambda_{k-L,k} \ldots \lambda_{k+L,k}]^T \text{ is}$$

represented.

Also, it can be represented in $\lambda_{k,k} = \overline{H}_k$, $\lambda_{k+1,k} = \xi_1 dH_k$, $\lambda_{k-1,k} = \xi^*_1 dH_k$ In other word, when L is 1, the channel matrix is $$\Lambda_k = \begin{bmatrix} \lambda_{k-1,k-2} & \lambda_{k-1,k-1} & \lambda_{k-1,k} & 0 & 0 \\ 0 & \lambda_{k,k-1} & \lambda_{k,k} & \lambda_{k,k+1} & 0 \\ 0 & 0 & \lambda_{k+1,k} & \lambda_{k+1,k+1} & \lambda_{k+1,k+2} \end{bmatrix},$$

when L is 2, the channel matrix is $$\Lambda_k = \begin{bmatrix} \lambda_{k-2,k-4} & \lambda_{k-2,k-3} & \lambda_{k-2,k-2} & \lambda_{k-2,k-1} & \lambda_{k-2,k} & 0 & 0 & 0 & 0 \\ 0 & \lambda_{k-1,k-3} & \lambda_{k-1,k-2} & \lambda_{k-1,k-1} & \lambda_{k-1,k} & \lambda_{k-1,k+1} & 0 & 0 & 0 \\ 0 & 0 & \lambda_{k,k-2} & \lambda_{k,k-1} & \lambda_{k,k} & \lambda_{k,k+1} & \lambda_{k,k+2} & 0 & 0 \\ 0 & 0 & 0 & \lambda_{k+1,k-1} & \lambda_{k+1,k} & \lambda_{k+1,k+1} & \lambda_{k+1,k+2} & \lambda_{k+1,k+3} & 0 \\ 0 & 0 & 0 & 0 & \lambda_{k+2,k} & \lambda_{k+2,k+1} & \lambda_{k+2,k+2} & \lambda_{k+2,k+3} & \lambda_{k+2,k+4} \end{bmatrix}$$

As known by equations 10 to 12, a 2LX2L inverse matrix operation for each sub-carrier of an OFDM signal is required to perform the L-order LMMSE method. However, as shown in the channel matrix, many elements are set to 0 and a previously calculated result of a channel matrix, e.g., an operational result of a channel matrix corresponding to $(k-1)^{th}$ to $(k-L)^{th}$ sub-carrier, may be used in calculating a channel matrix corresponding to a $k^{th}$ sub-carrier.

Accordingly, actual complexity may be as much as 0 $((1+2L)^2 N)$. If L is a small number, a L-order LMMSE method may greatly reduce complexity compared to a full LMMSE method. Meanwhile, an ICI element produced by a sub-carrier disregarded to reduce complexity in the L-order LMMSE method as described above may be cancelled by a DFE method.

The DFE method uses an equalized result of a standard OFDM demodulation signal to reconstruct an ICI element. A DFE equalizer can be represented by the equation below.

$$R'_k = R_k - \sum_{q=-Q}^{Q} \hat{S}_{k+q} dH_{k+q} \xi_q \qquad \text{(Equation 13)}$$

Here, $\hat{S}_k$, shows a decided result after a signal demodulated by the standard OFDM demodulation method is equalized.

The $2^{nd}$ term at the right side shows an ICI element of a $k^{th}$ sub-carrier. Accordingly, $R'_k$ displays a signal which an ICI element is cancelled and the $R'_k$ may be equalized by a conventional one-tap equalizer.

As shown in equation 13, the DFE method linearly increases as Q increases. Therefore, Q is set to about between 10 and 20 in an actual DFE equalizer. That is, an ICI element based on nearby 10 to 20 sub-carriers can be estimated with very low complexity. However, as described above, the DFE method may have an error propagation effect, and the error propagation effect may cause a decline in performance in a time-varying multi-path environment.

The error propagation effect is influenced by an initial error percentage made by a conventional equalizer. That is, when the initial error percentage by the conventional equalizer is comparably low, canceling a reproduced ICI element from a received signal may lead to an improvement in performance (i.e., decrease of an error percentage by ICI) since there is little difference between a reproduced ICI element and an actual ICI element. Also, by going through such a decision-feedback method repetitively, and as an error percentage lowers, reproduced ICI elements get gradually similar to an actual ICI element. Finally, the error percentage may further be lowered leading to an increase of the performance.

However, when an initial error percentage by a conventional equalizer is comparably high, it makes a reproduced ICI element incorrect and an incorrect ICI element is cancelled from a received signal resulting in an increase of an error percentage. By going through a decision-feedback method repetitively based on an increased error percentage, the performance of the system falls gradually.

As discussed above, the error propagation effect, the biggest disadvantage in a DFE mode, is greatly influenced by an initial error percentage. Therefore, a LMMSE method (especially, L-order LMMSE), which has comparably high complexity but has ideal performance, may be used for nearby sub-carriers having a relatively high influence on an ICI element.

On the other hand, a low-complexity DFE method is used to cancel ICI components produced by distant sub-carriers. Since each distant sub-carrier contributes a small amount of ICI (see. FIG. 2) incorrect decisions do not significantly influence the reconstructed ICI, therefore, the error propagation effects are significantly reduced.

That is, in the two step ICI cancellation method according to an embodiment the present invention, in order to cancel an ICI element of a $k^{th}$ sub-carrier as illustrated in FIG. 2, a DFE method is used for sub-carriers farther away from the $k^{th}$ sub-carrier than the nearby 2L sub-carriers, and a LMMSE method (especially a L-order LMMSE method) is used for the nearby 2L sub-carriers.

Figure 4:
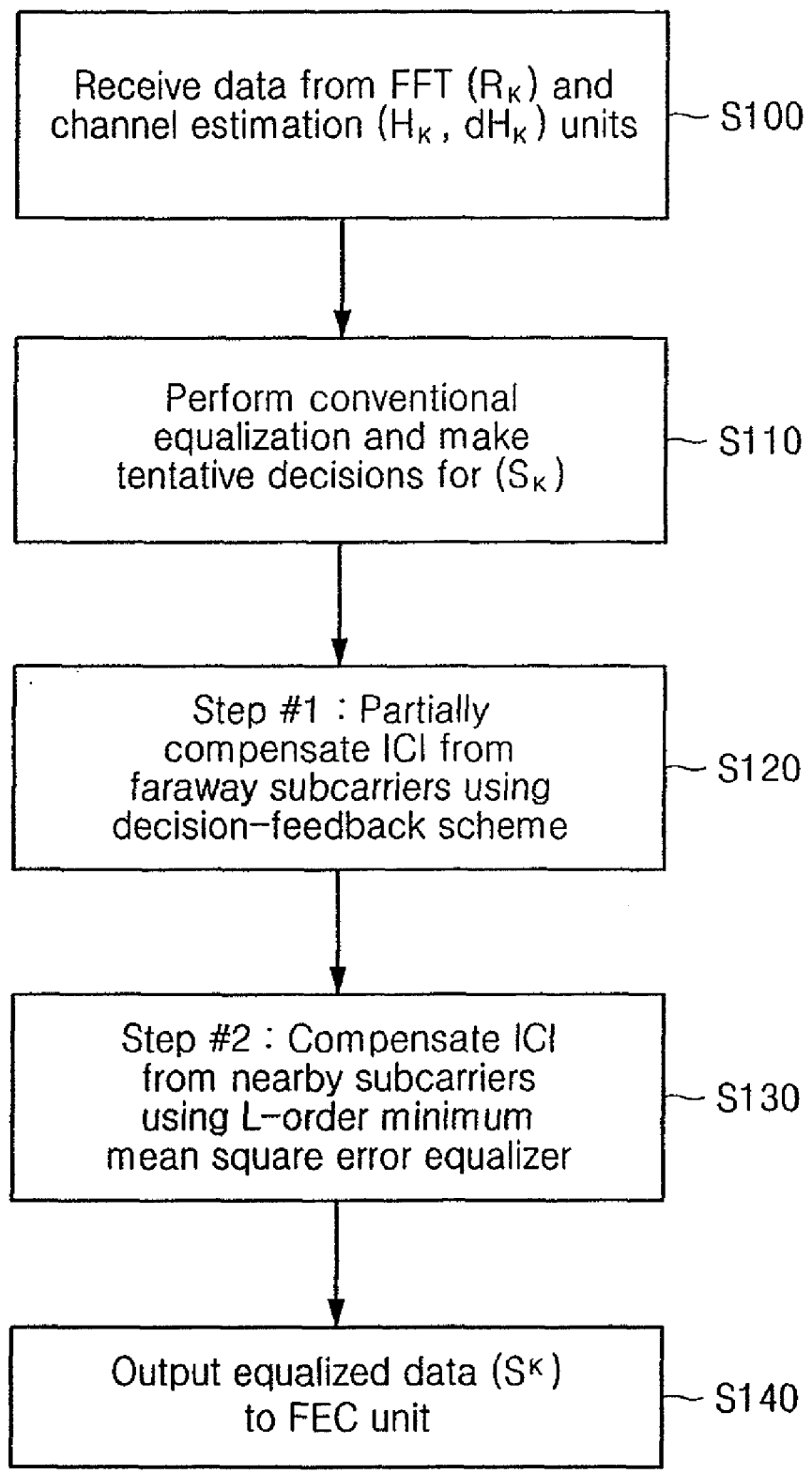
FIG. 4 is a flowchart explaining a two step ICI cancellation method according to an exemplary embodiment of the present invention.
Figure 5:
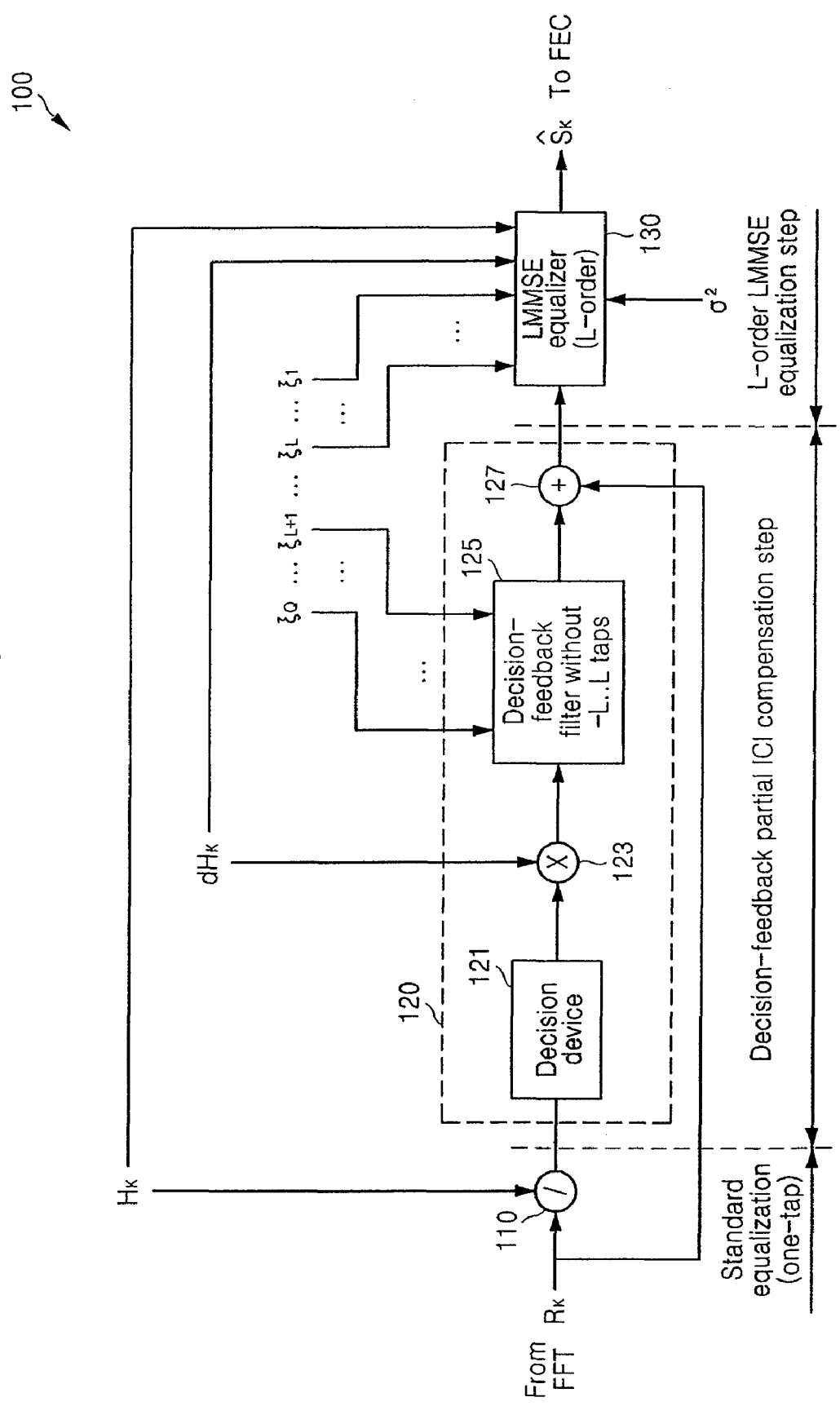
FIG. 5 illustrates an equalization apparatus according to an exemplary embodiment of the present invention.

FIG. 4 shows a flowchart explaining the two-step ICI cancellation method according to an exemplary embodiment of the present invention, and FIG. 5 shows an equalization apparatus according to an exemplary embodiment of the present invention. Referring to FIGS. 4 and 5, an equalization apparatus 100 of the present invention may receive in step S100 a signal $R_k$ output from a FFT unit (not shown), a channel frequency response $H_k$ and a channel slope vector $dH_k$, which are output from a channel estimation apparatus (not shown). The equalization apparatus includes an internal equalizer 110, a DFE compensator 120, and a LMMSE equalizer 130.

At Step S110, the internal equalizer 110 performs equalization of a signal $R_k$ output from the FFT unit (not shown) based on the channel frequency response output from the channel estimation apparatus (not shown). A conventional one-tap equalizer may be used. The one-tap equalizer may perform equalization by dividing $R_k$ by the channel frequency response $H_k$.

The DFE compensator 120 may include a decision apparatus 121, a second operational apparatus 123, a DFE filter 125, and a third operational apparatus 127. The DFE compensator 120 may cancel an inter-carrier interference element of an equalized signal, output from the internal equalizer 110, by a DFE method.

The decision apparatus 121 may include a forward error correction FEC circuit (not shown).

In Step S120, the second operational apparatus 123, the DFE filter 135, and the third operational apparatus 127 may calculate and cancel an ICI element of at least one sub-carrier away from a $k^{th}$ sub-carrier as Q and below. Here, a sub-carrier away from a $k^{th}$ sub-carrier as Q and below means a sub-carrier having an index between K-Q and K+Q.

Now, it is explained how the DFE compensator 120 cancels an ICI element of a sub-carrier, which is away from the $k^{th}$ sub-carrier further than L and not exceeding Q (i.e., having an index from a $(k\pm(L+1))^{th}$ sub-carrier to a $(K\pm Q)^{th}$ sub-carrier) according to an exemplary embodiment of the present invention.

As illustrated in FIG. 2, in order to cancel an ICI element of a sub-carrier away from a $k^{th}$ sub-carrier such as $\pm(k+L+1, k+L+2, \ldots k+Q)$ (here, $Q \geq L$), the DFE compensator 120 performs the process described in the equation below.

$$R'_k = R_k - \sum_{q=L+1}^{Q} \hat{S}_{k+q} dH_{k+q} \xi_q - \sum_{q=-Q}^{-(L+1)} \hat{S}_{k+q} dH_{k+q} \xi_q \quad \text{(Equation 14)}$$

As described above, most energy of an ICI element is generated by nearby sub-carriers, so that an error propagation effect is worse when a decision on a nearby sub-carrier is made incorrectly.

Accordingly, the DFE method described in equation 14 may not affect the error propagation effect since it does not perform a DFE method for the closest 2L sub-carriers.

However, since an ICI element produced by a nearby sub-carrier, which is the most influential, is not cancelled, it is difficult to expect an optimum performance by using only the DFE method described in equation 14. The second operational apparatus 123, the DFE filter 125, and the third operational apparatus 127, which are included in the DFE compensator 120, may be used in calculating the right side of equation 14.

The second operational apparatus 123 may multiply a signal output from the decision apparatus 121 by a channel Slope vector $dH_k$ output from the channel estimation apparatus (not shown). The DFE filter 125 may filter an ICI element generated by a sub-carrier away from a signal output from the second operational apparatus 123 further than L and not exceeding Q (Q is a natural number more than or equal to 2 and less than n/2, n is a number of sub-carriers).

For this, the DFE filter 125 may further receive channel matrix coefficients $\xi_Q \ldots \xi_{L+1}$ output from a predetermined operational apparatus (not shown) included additionally in the equalization apparatus 120. The predetermined operational apparatus (not shown) may also further output another channel matrix coefficients to the LMMSE equalizer 130, The third operational apparatus 127 may subtract a signal output from the DFE filter 125 from a signal output from the FFT unit (not shown).

Thus, an ICI cancellation process by a LMMSE method (especially, L-order LMMSE) may be performed in step S130 after the ICI cancellation process by a DFE method as described above.

The case in which the LMMSE equalizer 130 is a L-order LMMSE equalizer may be expressed as an equation by inserting a signal $R_k$ of equation 14 into equation 10 expressing a L-order LMMSE method.

That is, it is attained by inserting $R'_k = [R'_{k-L} \ldots R'_{k+L}]^T$ of equation 14 into $R_k = [R_{k-L} \ldots R_{k+L}]^T$ of equation 10.

Accordingly, the LMMSE equalizer 130 may cancel an inter-carrier interference element, which is generated by a sub-carrier L or less away from the $k^{th}$ sub-carrier, from a signal output from the DFE compensator 120 (L is a natural number more than or equal to 1 and less than n/2).

In step S140, the LMMSE equalizer 130 may output a signal, which is equalized by canceling an ICI element by a LMMSE method (especially, a L-order LMMSE method), to a decoder (not shown). The two step ICI cancellation method according to an exemplary embodiment of the present invention may considerably reduce the error propagation effect compared to a conventional decision-feedback method, and may cancel ICI produced by far away sub-carriers by a DFE method without an exponential increase of complexity compared to only using a Q-order LMMSE method.

Figure 6:
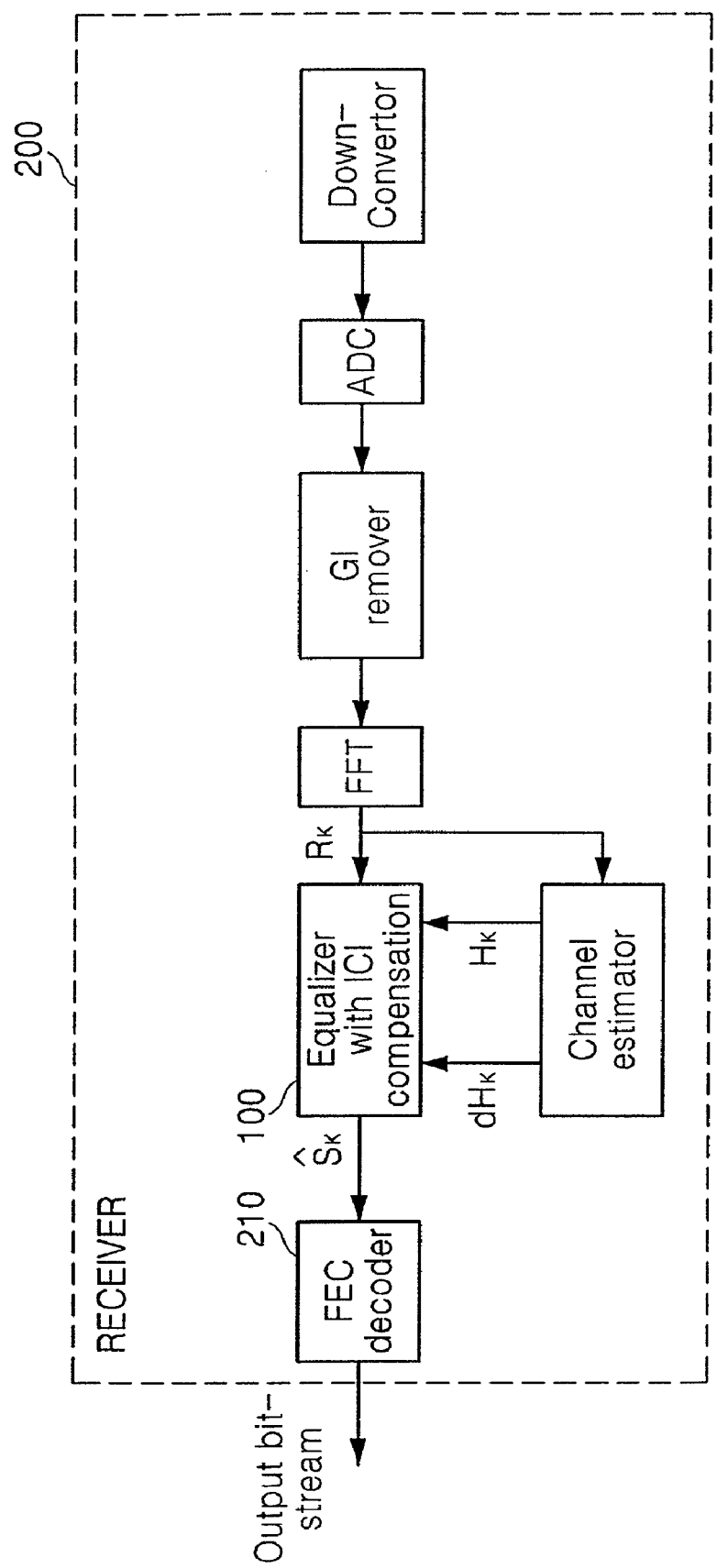
FIG. 6 illustrates a functional block diagram of an OFDM receiver according to an exemplary embodiment of the present invention.

FIG. 6 shows a functional block diagram of an OFDM receiver according to an exemplary embodiment of the present invention. Referring to FIG. 6, an OFDM receiver 200 according to an exemplary embodiment of the present invention may include a two-step equalization apparatus 100 and a decoder 210 as described above. The decoder 210 may receive a signal output from the equalization apparatus 100 and decode a received signal. The decoder 210 may be embodied as a FEC decoder. The OFDM receiver 200 may further include a down-converter, an ADC, a GI remover, a FFT unit, and/or a channel estimation apparatus as described above.

Figure 7:
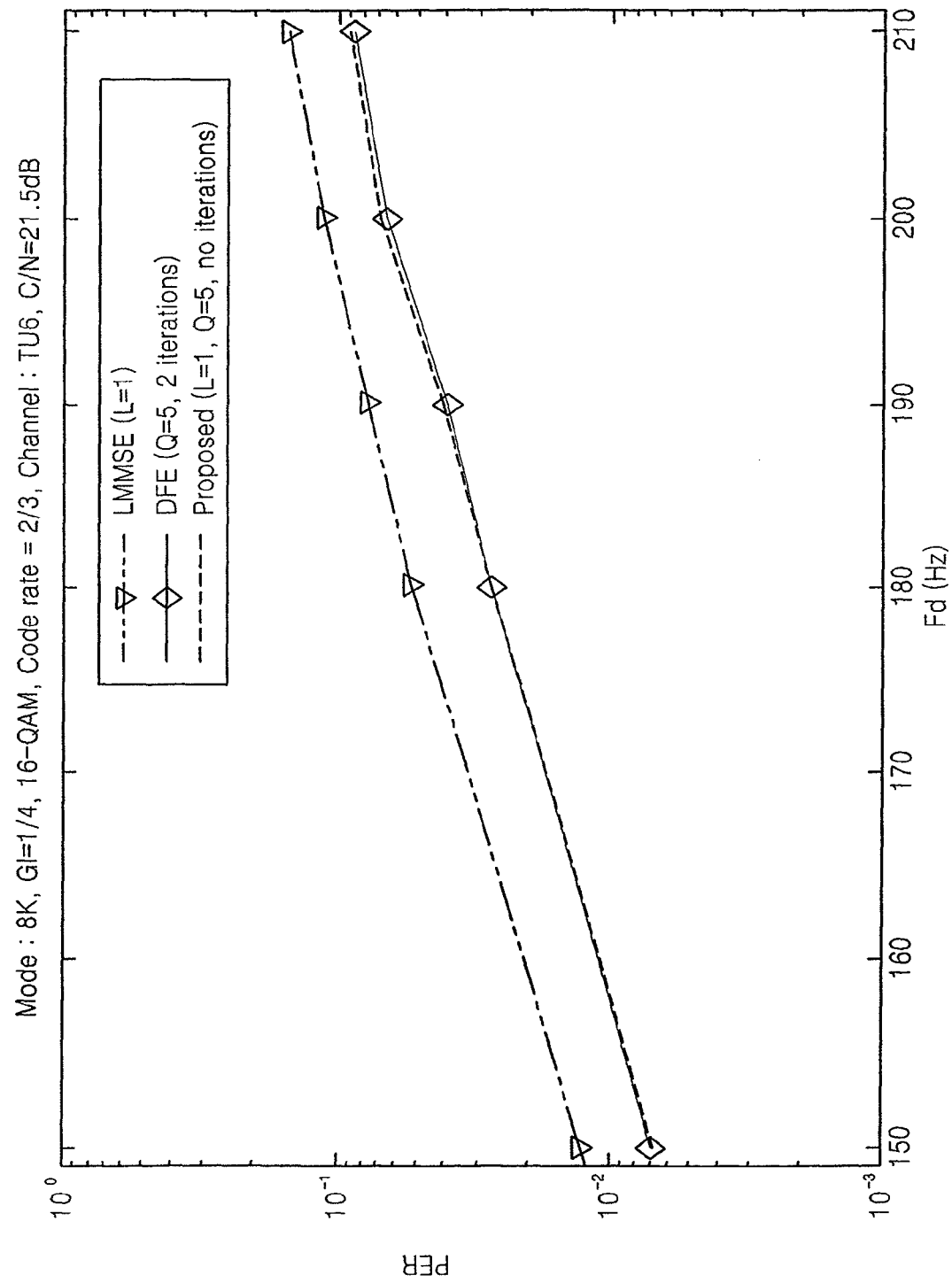
FIGS. 7 and 8 show simulation results comparing an ICI cancellation method according to an exemplary embodiment of the present invention with conventional methods.
Figure 8:
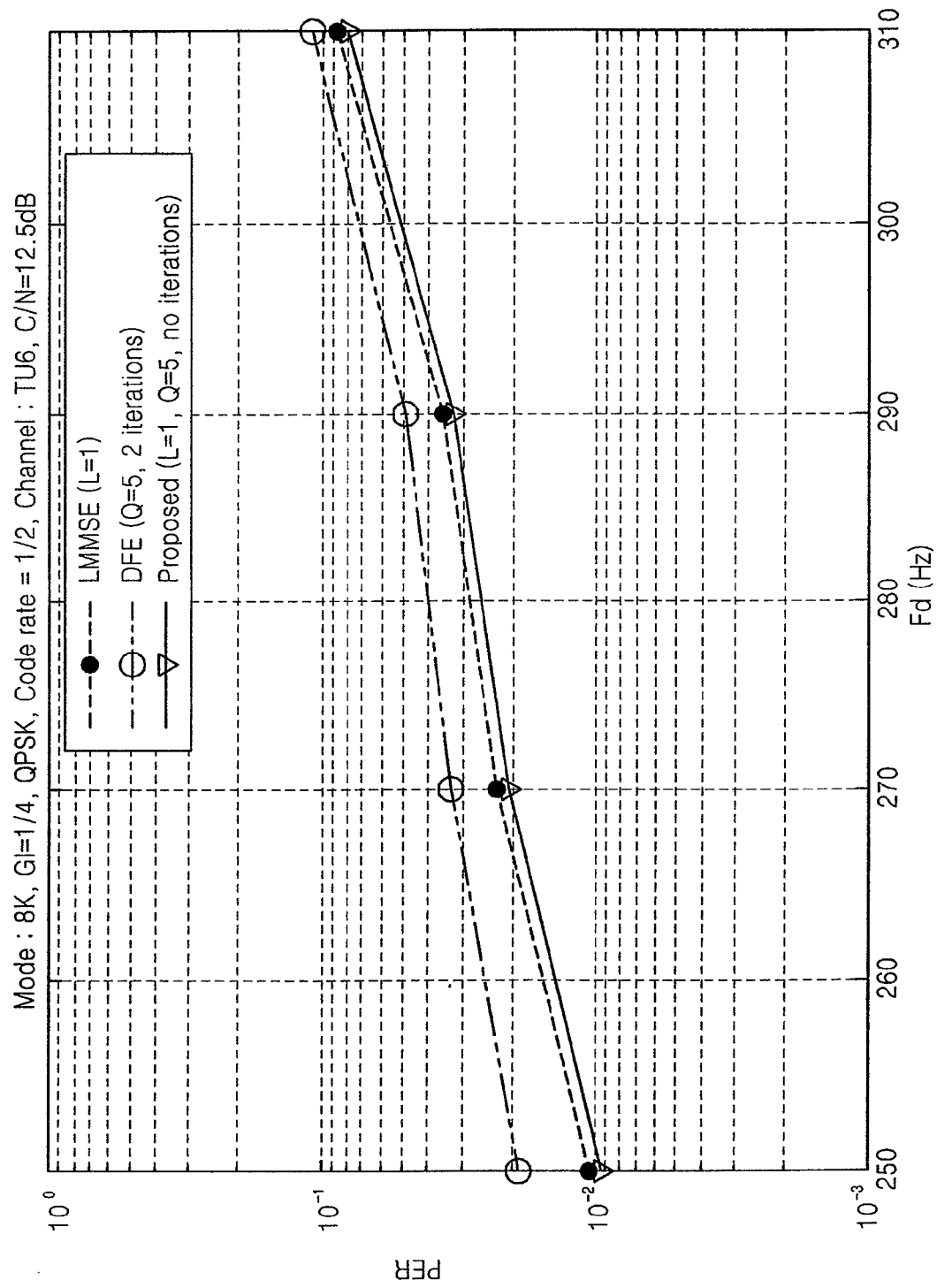

FIGS. 7 and 8 show simulation results comparing an ICI cancellation method according to an exemplary embodiment of the present invention with conventional methods. Referring to FIG. 7, an L-order LMMSE method has lowered performance compared to a DFE method and an ICI cancellation method according to an exemplary embodiment of the present invention. This is because L is not large enough to cancel an ICI element.

Also, a conventional DFE method performs two iterations, so that its complexity is similar to an ICI cancellation method according to an exemplary embodiment of the present invention. In this case, an ICI cancellation method according to an exemplary embodiment of the present invention has similar performance to a conventional DFE method. On the other hand, as illustrated in FIG. 8, when a Doppler frequency is high, i.e., when moving at a great speed, a conventional DFE method has greatly lowered performance because of the error propagation effect.

The ICI cancellation method according to an exemplary embodiment of the present invention has improved performance compared to a conventional DFE method and a LMMSE method, because it cancels an ICI element produced by a comparably far away sub-carrier with low complexity while reducing the error propagation effect.

Although exemplary embodiments of the present invention have been shown and described, it will be appreciated by those skilled in the art that various modifications, additions, and substitutions are possible without departing from the scope and spirit of the disclosure.

What is claimed is:

1. An inter-carrier interference (ICI) cancellation method of a $k^{th}$ sub-carrier of an orthogonal frequency division multiplexing (OFDM) receiving signal (k is a natural number greater than 1 and smaller than or equal to n, n is a number of sub-carriers), comprising:
   canceling an inter-carrier interference element, produced by at least one sub-carrier, among inter-carrier interference elements of the $k^{th}$ sub-carrier by a decision feedback equalization (DFE) method; and
   canceling another inter-carrier interference element, produced by at least one second sub-carrier, among inter-carrier elements of the $k^{th}$ sub-carrier by a linear minimum mean square error equalization (LMMSE) method comprising canceling inter-carrier interference elements produced by the kth sub-carrier to a (k±L)th sub-carrier (wherein L is a natural number more than or equal to 1 and less than n/2).

2. The method of claim 1, wherein canceling by the DFE method comprises canceling inter-carrier interference elements produced by a $(k\pm(L+1))^{th}$ sub-carrier to a $(k\pm Q)^{th}$ sub-carrier (wherein Q is a natural number more than or equal to 2 and less than n/2).

3. The method of claim 2, wherein L is a natural number smaller than Q.

4. The method of claim 1, wherein the LMMSE is a L-order LMMSE.

5. An equalization method comprising:
   equalizing a signal output from a fast Fourier transform (FFT) unit based on a channel frequency response output from a channel estimation apparatus;
   canceling an inter-carrier interference element produced by at least one sub-carrier among inter-carrier interference elements of a $k^{th}$ sub-carrier of the equalized signal by a decision feedback equalization (DFE) method; and
   canceling another inter-carrier interference element produced by at least one second sub-carrier among inter-carrier interference elements of the $k^{th}$ sub-carrier by a linear minimum mean square error equalization (LMMSE) method comprising canceling inter-carrier interference elements produced by the $k^{th}$ sub-carrier to a $(k\pm L)^{th}$ sub-carrier (wherein k is a natural number greater than 1 and less than or equal to n, n is a number of sub-carriers and L is a natural number greater than or equal to 1 and less than n/2).

6. The method of claim 5, wherein canceling by the DFE method comprises canceling an inter-carrier interference elements produced by the $k^{th}$ sub-carrier to a $(k\pm Q)^{th}$ sub-carrier (wherein Q is a natural number greater than or equal to 2, and less than n/2).

7. The method of claim 5, wherein canceling by the DFE method comprises canceling inter-carrier interference elements produced by a $(k\pm(L+1))^{th}$ sub-carrier to a $(k\pm Q)^{th}$ sub-carrier (wherein Q is a natural number greater than L, and greater than or equal to 2 and less than n/2).

8. An equalization apparatus comprising:
   an internal equalizer equalizing a signal output from a fast Fourier transform (FFT) unit based on a channel frequency response output from a channel estimation apparatus;
   a decision feedback equalization (DFE) compensator canceling an inter-carrier interference element of a signal output from the internal equalizer by a DFE method; and
   a linear minimum mean square error (LMMSE) equalizer canceling another inter-carrier interference element of a signal output from the DFE compensator by a LMMSE method,
   wherein the DFE compensator comprises:
   a decision apparatus making a preliminary decision on a signal output from the internal equalizer;
   a multiplier multiplying a signal output from the decision apparatus by a channel slope vector output from the channel estimation apparatus;
   a DFE filter filtering an inter-carrier interference element produced by at least one sub-carrier among inter-carrier elements of a $k^{th}$ sub-carrier of a signal output from the multiplier by a DFE method; and
   a subtractor subtracting a signal output from the DFE filter from a signal output from the FFT unit (k is a natural number greater than 1 and less than or equal to n, n is a number of sub-carriers).

9. The equalization apparatus of claim 8, wherein the internal equalizer comprises a divider dividing the signal output from the FFT unit by the channel frequency response output.

10. The equalization apparatus of claim 8, wherein the LMMSE equalizer cancels another inter-carrier interference element produced by at least another sub-carrier among inter-carrier interference elements of the $k^{th}$ sub-carrier of the signal output from the DFE compensator by the LMMSE method.

11. The equalization apparatus of claim 10, wherein the LMMSE equalizer cancels inter-carrier interference elements produced by the $k^{th}$ sub-carrier to a $(k\pm L)^{th}$ sub-carrier (L is a natural number more than or equal to 1 and less than n/2).

12. The equalization apparatus of claim 11, wherein the DFE filter cancels an inter-carrier interference elements produced by the $k^{th}$ sub-carrier to a$(k\pm Q)^{th}$ sub-carrier (Q is a natural number more than or equal to 2 and less than n/2).

13. The equalization apparatus of claim 12, wherein the DFE filter cancels an inter-carrier interference elements produced by a $(k\pm(L+1))^{th}$ sub-carrier to a $(k\pm Q)^{th}$ sub-carrier.

14. The equalization apparatus of claim 12, wherein L is a natural number smaller than Q.

15. The equalization apparatus of claim 8, wherein the LMMSE equalizer is a L-order LMMSE equalizer.

16. An OFDM receiver comprising:
   an equalization apparatus described in claim 8; and
   a decoder receiving and decoding a signal output from the equalization apparatus.

* * * * *